United States Patent
Ishii (10) Patent No.: US 10,468,972 B2
(45) Date of Patent: Nov. 5, 2019

(54) POWER CONVERTER INCLUDING A PLURALITY OF CONVERTER CELLS CONNECTED IN MULTIPLE SERIES

(71) Applicant: Mitsubishi Electric Corporation, Chiyoda-ku (JP)

(72) Inventor: Yuki Ishii, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/094,390

(22) PCT Filed: Apr. 11, 2017

(86) PCT No.: PCT/JP2017/014841
§ 371 (c)(1),
(2) Date: Oct. 17, 2018

(87) PCT Pub. No.: WO2017/203865
PCT Pub. Date: Nov. 30, 2017

(65) Prior Publication Data
US 2019/0131867 A1    May 2, 2019

(30) Foreign Application Priority Data
May 25, 2016 (JP) .................. 2016-104148

(51) Int. Cl.
*H02M 1/32* (2007.01)
*H02M 7/12* (2006.01)
(Continued)

(52) U.S. Cl.
CPC ............... *H02M 1/32* (2013.01); *H02M 7/12* (2013.01); *H02M 7/48* (2013.01); *H02M 2001/0009* (2013.01); *H02M 2001/325* (2013.01)

(58) Field of Classification Search
CPC ........ H02M 1/32; H02M 1/38; H02M 1/1233; H02M 7/48; H02M 7/483; H02M 7/4835;
(Continued)

(56) References Cited

U.S. PATENT DOCUMENTS 9,866,120 B2 * 1/2018 Koyanagi ............... H02M 1/32
2015/0124506 A1 * 5/2015 Sahoo ................... H02M 5/225
363/126
(Continued)

FOREIGN PATENT DOCUMENTS

| EP | 3 107 172 A1 | 12/2016 |
| WO | WO 2015/121983 A1 | 8/2015 |
| WO | WO 2015/133365 A1 | 9/2015 |

OTHER PUBLICATIONS

International Search Report dated May 23, 2017, in PCT/JP2017/014841 filed Apr. 11, 2017.
(Continued)

*Primary Examiner* — Yemane Mehari
(74) *Attorney, Agent, or Firm* — Oblon, McClelland, Maier & Neustadt, L.L.P.

(57) ABSTRACT

A converter cell includes first and second arms, each of which includes a semiconductor switching element and a diode, and a short circuit part connected in parallel to the second arm, and when a DC fault detection unit detects occurrence of a DC fault, a control circuit outputs, to the converter cell, a fault handling command for setting the short circuit part to a conductive state, setting the semiconductor switching element to a conductive state, and setting the semiconductor switching element to a non-conductive state, to thereby set both the semiconductor switching element and the diode to conductive states in the second arm.

9 Claims, 9 Drawing Sheets

(51) Int. Cl.
*H02M 7/48* (2007.01)
*H02M 1/00* (2006.01)
(58) Field of Classification Search
CPC ......... H02M 7/797; H02M 2001/0009; H02M 2001/322; H02M 2001/325
USPC .......................... 363/50, 53, 56.02, 56.04, 58
See application file for complete search history.

(56) References Cited

U.S. PATENT DOCUMENTS

| | | |
|---|---|---|
| 2016/0013716 A1* | 1/2016 | Hur .......................... H02M 1/32 363/50 |
| 2017/0012521 A1* | 1/2017 | Jimichi ................. H02M 7/483 |
| 2018/0138826 A1* | 5/2018 | Jimichi ................... H02M 1/32 |
| 2019/0028020 A1* | 1/2019 | Chen ................... H02M 5/4585 |

OTHER PUBLICATIONS

Hagiwara, M. et al., "PWM Control and Experiment of Modular Multilevel Converters", The Transactions of the Institute of Electrical Engineers of Japan, vol. 128, No. 7, 2008, 10 pages.

* cited by examiner

WHEN Icell > 0

|  | OPERATION OF ELEMENTS | | | | DESCRIPTION OF OUTPUT STATE |
|---|---|---|---|---|---|
|  | 1 1 u | 1 1 b | 1 2 u | 1 2 b |  |
| STATE 1 | ON | OFF | ON | OFF | OUTPUT CAPACITOR VOLTAGE |
| STATE 2 | OFF | ON | OFF | OFF | OUTPUT 0 V |
| STATE 3 | OFF | OFF | ON | OFF | OUTPUT CAPACITOR VOLTAGE |
| STATE 4 | ON | ON | OFF | OFF | NOT USED (CAPACITOR IS SHORT-CIRCUITED) |

FIG. 3B

WHEN Icell < 0

|  | OPERATION OF ELEMENTS | | | | DESCRIPTION OF OUTPUT STATE |
|---|---|---|---|---|---|
|  | 1 1 u | 1 1 b | 1 2 u | 1 2 b |  |
| STATE 1 | ON | OFF | OFF | OFF | OUTPUT CAPACITOR VOLTAGE |
| STATE 2 | OFF | ON | OFF | ON | OUTPUT 0 V |
| STATE 3 | OFF | OFF | OFF | ON | OUTPUT 0 V |
| STATE 4 | ON | ON | OFF | OFF | NOT USED (CAPACITOR IS SHORT-CIRCUITED) |

POWER CONVERTER INCLUDING A PLURALITY OF CONVERTER CELLS CONNECTED IN MULTIPLE SERIES

TECHNICAL FIELD

The present invention relates to a power converter, and more particularly, to a power converter including a plurality of converter calls, which are connected in multiple series.

BACKGROUND ART

In recent years, in power converters used for high-voltage use, for example, a power system, multilevel converters each including a plurality of converter cells, which are connected in multiple series, have been put to practical use. Those converters are called a modular multilevel converter (MMC) system, a cascaded multilevel converter (CMC) system, or the like. In the related art, there is known, for example, a system in which a converter cell is formed of a semiconductor switching element, for example, an IGBT (see Non Patent Literature 1, for example).

CITATION LIST

Non Patent Literature

[NPL 1] Hagiwaia Makoto and Akagi Hirofumi, "PWM Control and Experiment of Modular Multilevel Converters (MMC)", The transactions of the Institute of Electrical Engineers of Japan. D, Vol. 128, No. 7, pp. 957-965, 2008 (p. 958, FIG. 1)

SUMMARY OF INVENTION

Technical Problem

Those power converters have had a problem in that, when a fault occurs in a DC system, a large fault current flows through a diode in a converter cell to cause a large power loss in the diode, with the result that the diode is broken.

The present invention has been made to solve the above-mentioned problem, and therefore has an object to provide a power converter capable of reducing a loss caused in a diode through which a fault current flows when a DC fault occurs, to thereby prevent the diode from being broken.

Solution to Problem

According to one embodiment of the present invention, there is provided a power converter, which is configured to interconnect an AC system and a DC system to transfer electric power, the power converter including: a DC terminal configured to transfer DC power; an AC terminal configured to transfer AC power; a plurality of converter cells, which are disposed between the DC terminal and the AC terminal and are connected in series to one another; a DC fault detection unit configured to detect a fault that has occurred in the DC system; and a control circuit configured to control each of the plurality of converter cells, wherein each of the plurality of converter cells includes: a first arm, which includes a first semiconductor switching element and a first diode; a second arm, which is connected in series to the first arm, and includes a second semiconductor switching element and a second diode; output terminals connected to both ends of the second arm; and a short circuit part connected in parallel to the second arm, wherein the control circuit is configured to output, when the DC fault detection unit detects the occurrence of the fault, a fault handling command to each of the plurality of converter cells, and wherein the fault handling command sets the short circuit part to a conductive state, sets the second semiconductor switching element to a conductive state, and sets the first semiconductor switching element to a non-conductive state.

Advantageous Effects of Invention

According to one embodiment of the present invention, when a DC fault occurs, in a converter cell, the diode and the semiconductor switching element are set to the conductive states at the same time so that the fault current to flow through the converter cell is split to flow through the diode and the semiconductor switching element, with the result that the loss caused in the diode is reduced as compared to a case in which the fault current flows only through the diode, and hence that the DC fault can be prevented from breaking the diode.

DESCRIPTION OF EMBODIMENTS

Now, a power converter according to each of embodiments of the present invention is described with reference to the drawings.

First Embodiment

In a first embodiment of the present invention, as the power converter, a power converter configured to interconnect a three-phase power system and a DC power system to transfer electric power is described as an example.

Figure 1:
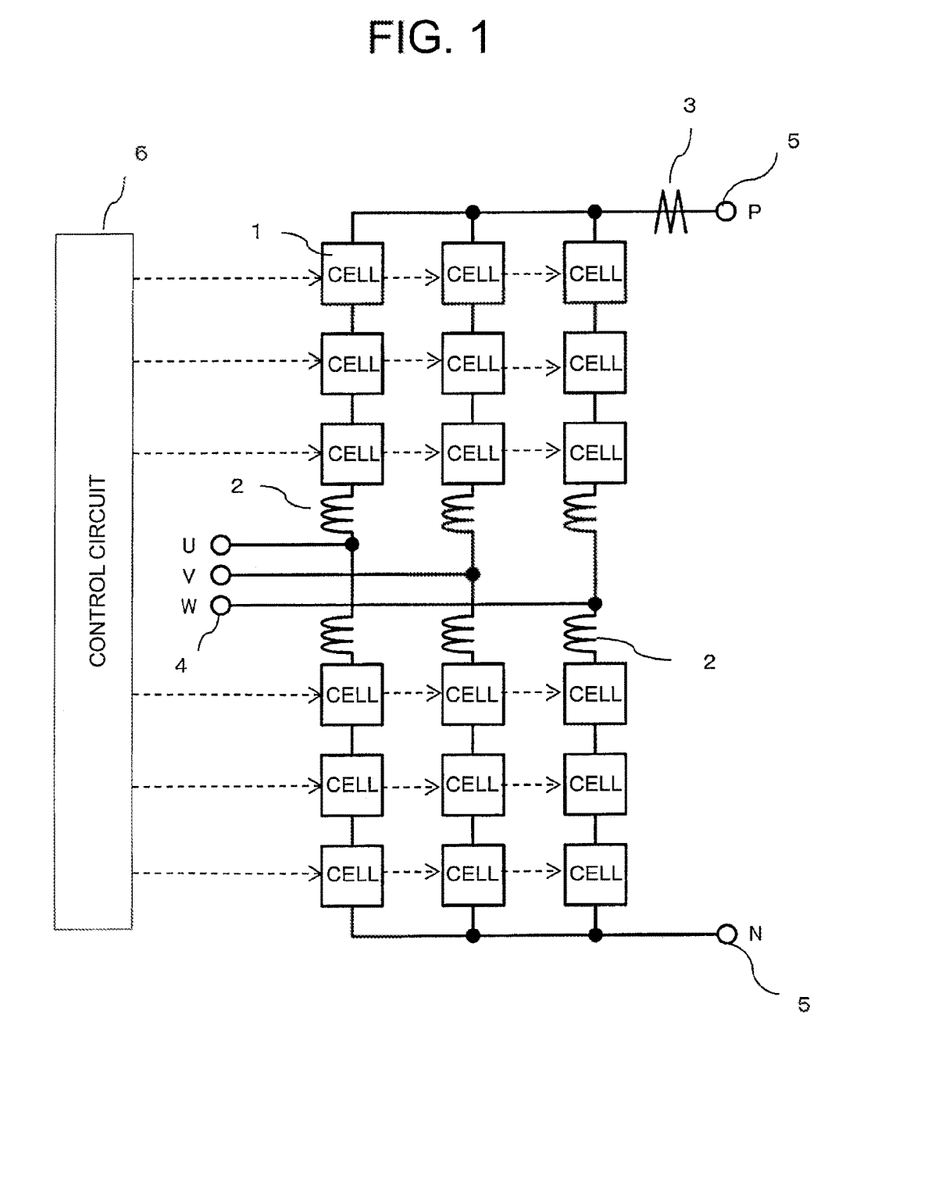
FIG. 1 is a circuit diagram for illustrating a configuration of a power converter according to a first embodiment of the present invention.

FIG. 1 is a configuration diagram for illustrating a configuration of a power converter according to the first embodiment. The configuration of the power converter according to the first embodiment is described with reference to FIG. 1.

In the first embodiment, as illustrated in FIG. 1, the power converter includes AC terminals 4 (hereinafter referred to as "AC terminals U, V, and W") and DC terminals 5 (hereinafter referred to as "DC terminals P and N"). Moreover, in the power converter, phase arms corresponding to a U phase, a V phase, and a W phase are disposed between the DC terminal P and the AC terminals U, V, and w, respectively. Similarly, phase arms corresponding to the U phase, the V phase, and the W phase are disposed between the DC terminal N and the AC terminals U, V, and H, respectively. Each phase arm is formed of a plurality of converter cells 1, which are connected in series to one another. In the example of FIG. 1, in each phase arm, three converter cells 1 are connected in series to one another. However, the present invention is not limited thereto, and the number of converter cells 1 in each phase arm may be any number.

The power converter according to the first embodiment is interconnected to the three-phase power system. Therefore, in FIG. 1, the example in which the AC terminals are formed of three terminals for the U phase, the V phase, and the W phase is illustrated. However, when the power converter according to the first embodiment is interconnected to a single-phase power system, it is equally possible to form the AC terminals of two terminals, and when the power converter according to the first embodiment is interconnected to a multiphase power system, it is equally possible to form the AC terminals of four or more terminals.

Moreover, in the first embodiment, as illustrated in FIG. 1, a reactor 2 is connected between the DC terminal P and each of the AC terminals U, V, and W. Similarly, a reactor 2 is connected between the DC terminal N and each of the AC terminals U, V, and W.

In the first embodiment, a mode in which the reactor 2 is connected between each of the AC terminals U, V, and W and each of the phase arms is described. However, the present invention is not limited thereto, and the reactor 2 may be connected between each of the DC terminals P and N and each of the phase arms. Moreover, there may be adopted a configuration in which the reactor 2 is connected only between each of the AC terminals U, V, and N and the DC terminal P, and there may also be adopted a configuration in which the reactor 2 is connected only between each of the AC terminals U, V, and w and the DC terminal N. Moreover, it is not always required for the reactor 2 to have a coil shape, and a cable having an intentionally long wiring length may also be used, for example.

Moreover, as illustrated in FIG. 1, a DC fault detection unit 3 configured to detect a short-circuit current generated at the time of a DC fault is disposed between the DC terminal P and the AC terminals U, V, and W. The DC fault detection unit 3 is formed of a current sensor. In the example of FIG. 1, the DC fault detection unit 3 is disposed between nodes of three phase arms and the DC terminal P.

In the first embodiment, the example in which the DC fault detection unit 3 is disposed on the DC terminal P side is described. However, the present invention is not limited thereto, and the DC fault detection unit 3 may be disposed on the DC terminal N side. Moreover, as the DC fault detection unit 3, a current sensor may be disposed on the side of each of the AC terminals U, V, and W. In that case, there may be employed a configuration method in which a sum of current detection values detected by the three current sensors is obtained to detect the short-circuit current generated at the time of the DC fault. Moreover, a current sensor of a shunt resistor method, a Hall element method, a magnetic resistor element method, a flux gate method, or the like may be used, and a sensor of another current detection method may also be used.

Moreover, as illustrated in FIG. 1, in the power converter according to the first embodiment, a control circuit 6 configured to control operation of each converter cell 1 is disposed. The control circuit 6 is configured to perform, for example, ON/OFF control of semiconductor switching elements and a short circuit part, which are disposed in each converter cell 1.

Figure 2A:
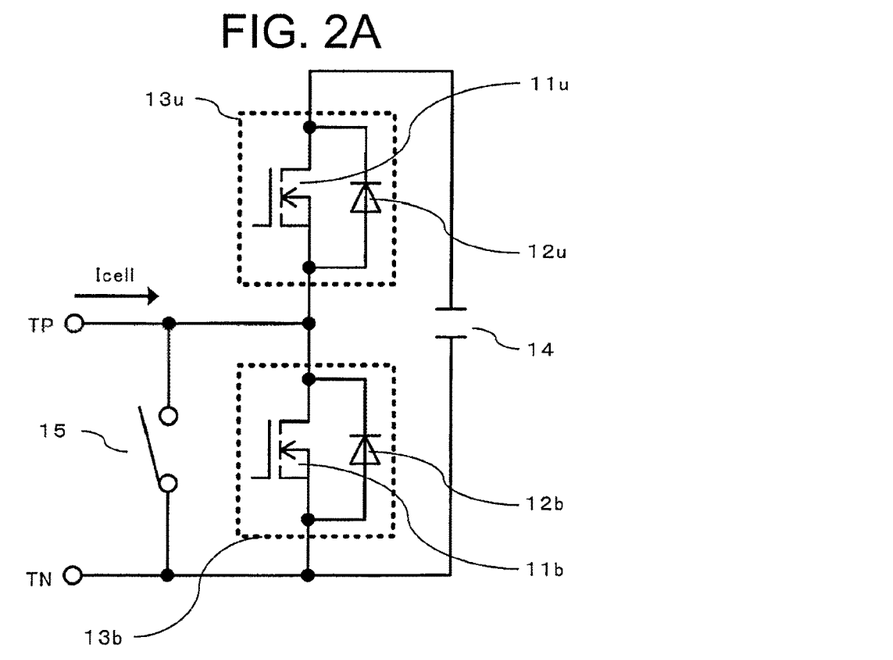
FIG. 2A is a circuit diagram for illustrating an example of a converter cell of the power converter according to the first embodiment of the present invention.

FIG. 2A is a configuration diagram for illustrating a configuration of the converter cell 1. The configuration of the converter cell 1 is described with reference to FIG. 2A.

As illustrated in FIG. 2A, the converter cell 1 includes a configuration of a chopper circuit. The converter cell 1 is formed of an upper arm 13u, a lower arm 13b, an energy storage device 14, a short circuit part 15, an output terminal TP, and an output terminal TN. The upper arm 13u is formed of a semiconductor switching element 11u, which is capable of reverse conduction, and a diode 12u, which are connected back-to-back to each other. Similarly, the lower arm 13b is formed of a semiconductor switching element 11b, which is capable of reverse conduction and a diode 12b, which are connected back-to-back to each other.

The upper arm 13u and the lower arm 13b are connected in series to each other to form a leg. The energy storage device 14 is connected in parallel to the leg. The short circuit part 15 is connected in parallel to the lower arm 13b. The output terminal TP is connected to one end of the lower arm 13b, and the output terminal TN is connected to the other end of the lower arm 13b.

In FIG. 2A, a metal-oxide-semiconductor field-effect transistor (MOSFET) is used as each of the semiconductor switching elements 11u and 11b. However, the present invention is not limited to that case, and as each of the semiconductor switching elements 11u and 11b, a semiconductor element capable of reverse conduction other than the MOSFET, for example, a reverse conducting insulated-gate bipolar transistor (IGBT) or a reverse conducting thyristor, may be used.

Moreover, when a diode is included in the semiconductor switching element 11u, the diode 12u illustrated in FIG. 2A may be omitted. Similarly, when a diode is included in the semiconductor switching element 11b, the diode 12b illustrated in FIG. 2A may be omitted.

Moreover, in the first embodiment, the example in which one parallel unit of the semiconductor switching elements 11u and 11b and the diodes 12u and 12b is used is described, but in order to increase a capacity of the power converter, a plurality of parallel units of the semiconductor switching elements 11u and 11b and the diodes 12u and 12b may be used.

In the first embodiment, a capacitor is used as the energy storage device 14. As the capacitor, an electrolytic capacitor, a film capacitor, or the like may be used, and a capacitor of another type may be used.

Moreover, as the short circuit part 15, a mechanical switch or a semiconductor switching element may be used, for example.

Figure 2B:
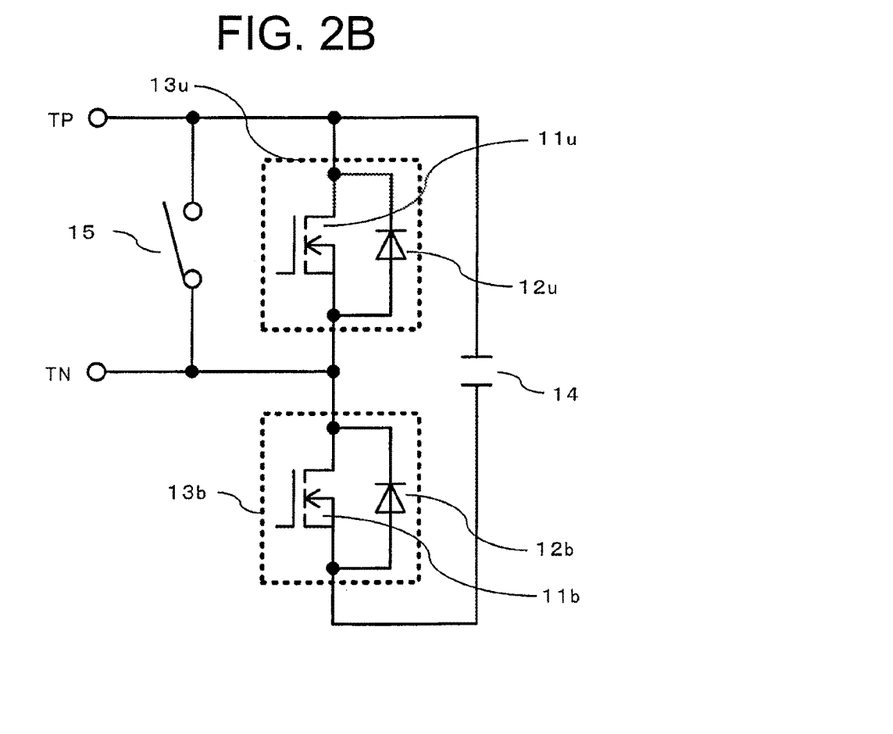
FIG. 2B is a circuit diagram for illustrating another example of the converter cell of the power converter according to the first embodiment of the present invention.

The configuration of the converter cell 1 may be such a circuit configuration as illustrated in FIG. 2B. As a difference from the circuit illustrated in FIG. 2A, the short circuit part 15 is connected in parallel to the upper arm 13u in FIG. 2B. Moreover, the output terminal TP is connected to one end of the upper arm 13u, and the output terminal TS is connected to the other end of the upper arm 13u. FIG. 2A and FIG. 2B are different only in those points.

The circuit configuration of the converter cell 1 is not limited to such chopper circuit as illustrated in each of FIG. 2A and FIG. 2B, and may be a circuit in which electric power may be communicated bidirectionally, for example, a full bridge circuit.

In the following description, the operation is described on the basis of the circuit configuration of FIG. 2A, but similar operation may be performed also in the circuit configuration of FIG. 2B.

A normal operation state of the converter cell 1 is described with reference to FIG. 3A and FIG. 3B. The reference symbol "Icell" in FIG. 3 indicates an electric current that enters the converter cell 1 from the output terminal TP as defined in the illustration of FIG. 2A. What conductive states the diodes 12u and 12b take when the semiconductor switching elements 11u and 11b perform switching operations are changed depending on the polarity of Icell. Therefore, in FIG. 3A, operation states of the converter cell 1 at the time when Icell takes a positive value are shown, and in FIG. 3B, operation states of the converter cell 1 at the time when Icell takes a negative value are shown.

Figure 3A:
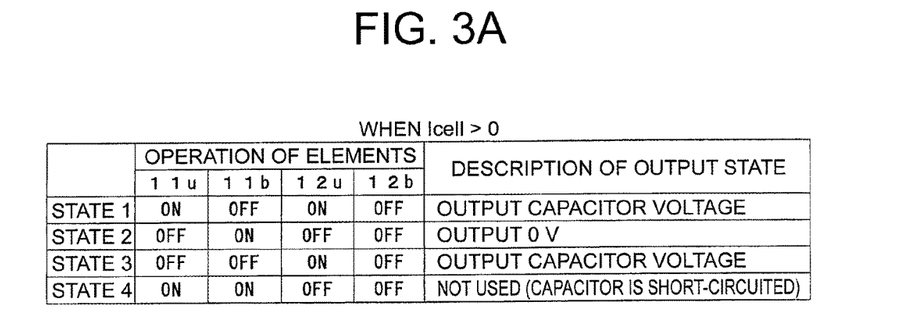
FIG. 3A is an explanatory table for showing operation of the converter cell of the power converter according to the first embodiment of the present invention.

First, with reference to FIG. 3A, the operation scales that can be taken by the converter cell 1 when Icell has a positive value are described. In this case, the converter cell 1 can take a total of four states: State 1 to State 4. The converter cell 1 is controlled so that a voltage between the output terminals TP and TN is set to zero or a capacitor voltage by the operation of turning ON/OFF the two semiconductor switching elements 11u and 11b.

As shown in FIG. 3A, State 1 is a case in which the semiconductor switching element 11u is set to a conductive state (ON) and the semiconductor switching element 11b is set to a non-conductive state (OFF). At this time, the diode 12u is set to a conductive state, and the diode 12b is set to a non-conductive state. In other words, as described above, the semiconductor switching element 11u has the reverse conduction characteristic, and hence Icell is split to the semiconductor switching element 11u and the diode 12u. Moreover, a voltage across both ends of the energy storage device 14 is applied between the output terminal TP and the output terminal TN. In other words, an output voltage of the converter cell 1 is set to the capacitor voltage.

As described above, in the case of State 1, Icell is split to the semiconductor switching element 11u and the diode 12u. In this manner, a voltage generated across both ends of the upper arm 13u when Icell flows through the semiconductor switching element 11u and the diode 12u is reduced as compared to a case in which Icell flows only through the diode 12u. A semiconductor conduction loss generated in the upper arm 13u is expressed by a product of Icell and the voltage generated across both ends of the upper arm 13u. Therefore, as compared to the case in which Icell flows only through the diode 12u, in the case where Icell is split to the semiconductor switching element 11u and the diode 12u, there is obtained the effect that the semiconductor conduction loss generated in the upper arm 13u is reduced.

State 2 is a case in which the semiconductor switching element 11u is set to a non-conductive state (OFF) and the semiconductor switching element 11b is set to a conductive state (ON). At this time, the diode 12u is set to a non-conductive state, and the diode 12b is also set to the non-conductive state. In other words, Icell flows through the semiconductor switching element 11b. Moreover, a short circuit is established between the output terminal TP and the output terminal TN. In other words, the output voltage of the converter cell 1 is set to 0 V.

State 3 is a case in which the semiconductor switching element 11u is set to the non-conductive state (OFF) and the semiconductor switching element 11b is set to the non-conductive state (OFF). At this time, the diode 12u is set to the conductive state, and the diode 12b is set to the non-conductive state. In other words, Icell flows through the diode 12u. Moreover, the voltage across both ends of the energy storage device 14 is applied between the output terminal TP and the output terminal TN. In other words, the output voltage of the converter cell 1 is set to the capacitor voltage.

State 4 is a case in which the semiconductor switching element 11u is set to the conductive state (ON) and the semiconductor switching element 11b is set to the conductive state (ON). This case is not used because a short-circuit state is established across both ends of the energy storage device 14.

Next, a method of switching among State 1 to State 3 in the converter cell 1 when Icell has a positive value is described. In the converter cell 1, alternate switching between State 1 and State 2 is performed to control the voltage output by the converter cell 1. State 3 may be intentionally inserted when State 1 and State 2 are switched so that the switching may be performed while preventing the converter cell 1 from taking State 4.

As described above, in the converter cell 1, in the case where Icell takes the positive value, the alternate switching operation between State 1 and State 2 is performed so that, when the diode 12u is set to the conductive state, the semiconductor switching element 11u is also set to the conductive state at the same time, with the result that the electric current Icell to flow through the converter cell 1 is split to the diode 12u and the semiconductor switching element 11u to reduce the semiconductor conduction loss generated in the upper arm 13u.

Figure 3B:
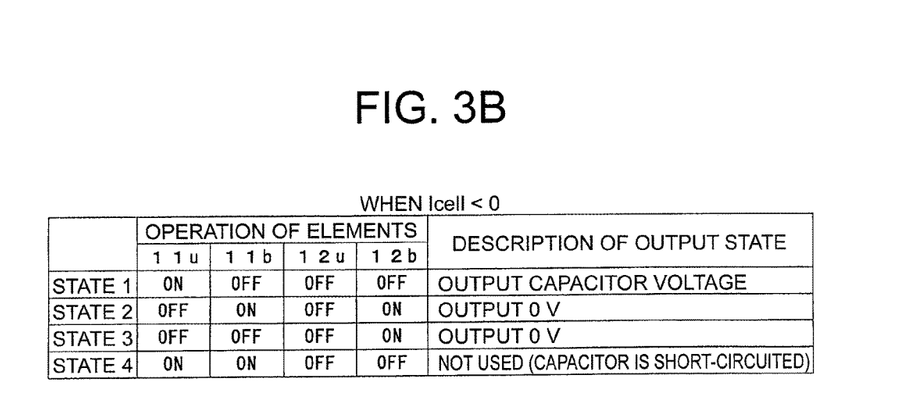
FIG. 3B is an explanatory table for showing operation of the converter cell of the power converter according to the first embodiment of the present invention.

Next, with reference to FIG. 3B, the operation states that can be taken by the converter cell 1 when Icell has a negative value are described. Also in this case, the converter cell 1 can take a total of four states: State 1 to State 4.

As shown in FIG. 3B, State 1 is a case in which the semiconductor switching element 11u is set to the conductive state (ON) and the semiconductor switching element 11b is set to the non-conductive state (OFF). At this time, the diode 12u is set to the non-conductive state, and the diode 12b is also set to the non-conductive state. In other words, Icell flows through the semiconductor switching element 11u. Moreover, the voltage across both ends of the energy storage device 14 is applied between the output terminal TP and the output terminal TN. In other words, an output voltage of the converter cell 1 is set to the capacitor voltage.

State 2 is a case in which the semiconductor switching element 11u is set to the non-conductive state (OFF) and the semiconductor switching element 11b is set to the conductive state (ON). At this time, the diode 12u is set to the non-conductive state, and the diode 12b is set to the conductive state, in other words, as described above, the semiconductor switching element 11b has the reverse conduction characteristic, and hence Icell is split to the semiconductor switching element 11b and the diode 12b. Moreover, a short circuit is established between the output terminal TP and the output terminal TN. In other words, the output voltage of the converter cell 1 is set to 0 V.

As described above, in the case of State 2, Icell is split to the semiconductor switching element 11b and the diode 12b. Thus, a voltage generated across both ends of the lower arm 13b when Icell flows through the semiconductor switching element 11b and the diode 12b is reduced as compared to a case in which Icell flows only through the diode 12b. A semiconductor conduction loss generated in the lower arm 13b is expressed by a product of Icell and the voltage generated across both ends of the lower arm 13b. Therefore, as compared to the case in which Icell flows only through the diode 12b, in the case where Icell is split to the semiconductor switching element 11b and the diode 12b, there is obtained the effect that the semiconductor conduction less generated in the lower arm 13b is reduced.

State 3 is a case in which the semiconductor switching element 11u is set to the non-conductive state (OFF) and the semiconductor switching element 11b is set to the non-conductive state (OFF). At this time, the diode 12u is set to the non-conductive state, and the diode 12b is set to the conductive state. In other words, Icell flows through the diode 12b. Moreover, a short circuit is established between the output terminal TP and the output terminal TN. In other words, the output voltage of the converter cell 1 is set to 0 V.

State 4 is a case in which the semiconductor switching element 11u is set to the conductive state (ON) and the semiconductor switching element 11b is set to the conductive state (ON). This case is not used because a short-circuit state is established across both ends of the energy storage device 14.

Next, a method of switching among State 1 to State 3 in the converter cell 1 when Icell has a negative value is described. In the converter cell 1, alternate switching between State 1 and State 2 is performed to control the voltage output by the converter cell 1. State 3 may be intentionally inserted when State 1 and State 2 are switched so that the switching may be performed while preventing the converter cell from taking State 4.

As described above, in the converter cell 1, in the case where Icell takes the negative value, the alternate switching operation between State 1 and State 2 is performed so that, when the diode 12b is set to the conductive state, the semiconductor switching element 11b is also set to the conductive state at the same time, with the result that the electric current Icell to flow through the converter cell 1 is split to the diode 12b and the semiconductor switching element 11b to reduce the semiconductor conduction loss generated in the lower arm 13b.

As described above, in the converter cell 1, in both cases where Icell takes positive and negative values, the alternate switching operation between State 1 and State 2 is performed, and hence it is not required to dispose means for detecting the polarity of Icell.

As a method of determining the timing to switch between State 1 and State 2 in the converter cell 1 under normal operating conditions, a known technology may be used as it is. For example, the technology described in Non Patent Literature 1 "PWM Control of Modular Multilevel Converters" may be applied, and hence a detailed description thereof is omitted.

Next, operation at the time when a DC fault of the power converter according to the first embodiment occurs is described.

Figure 4:
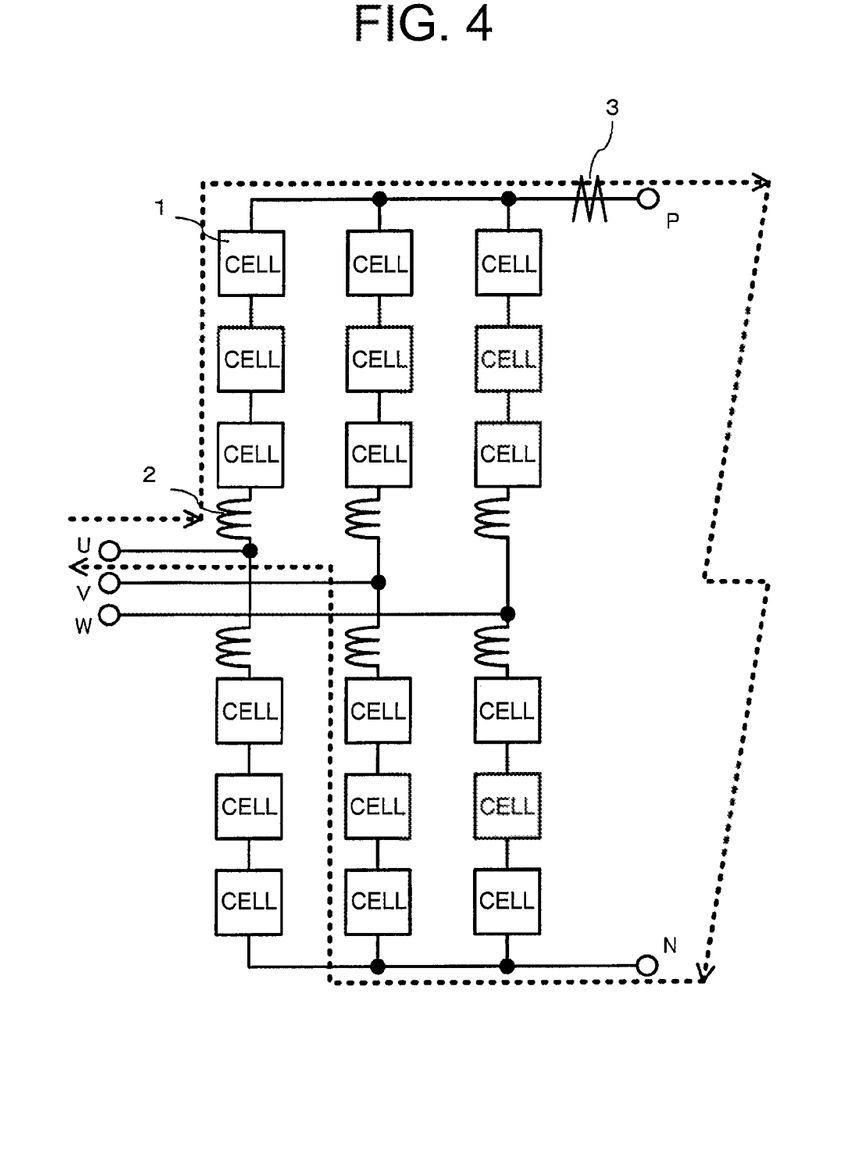
FIG. 4 is a diagram for illustrating an example of a fault current path at the time of a DC fault of the power converter according to the first embodiment of the present invention.

In FIG. 4, there is illustrated an example of a path of a fault current that flows when the DC fault occurs in the power converter according to the first embodiment, which is illustrated in FIG. 1.

In FIG. 4, there is illustrated a case in which the DC fault has occurred between the DC terminal P and the DC terminal N, that is, a short circuit between the DC terminal P and the DC terminal N has occurred. In this case, the short-circuit current indicated by the broken line in FIG. 4 flows in the power converter. This short-circuit current is hereinafter referred to as a "fault current". In the example of FIG. 4, a fault current path passing through the AC terminal U and the AC terminal V is exemplified.

When such fault current as described above flows, the DC fault detection unit 3 determines that the DC fault has occurred, and operation for handling the DC fault is performed in the converter cell 1.

Figure 5:
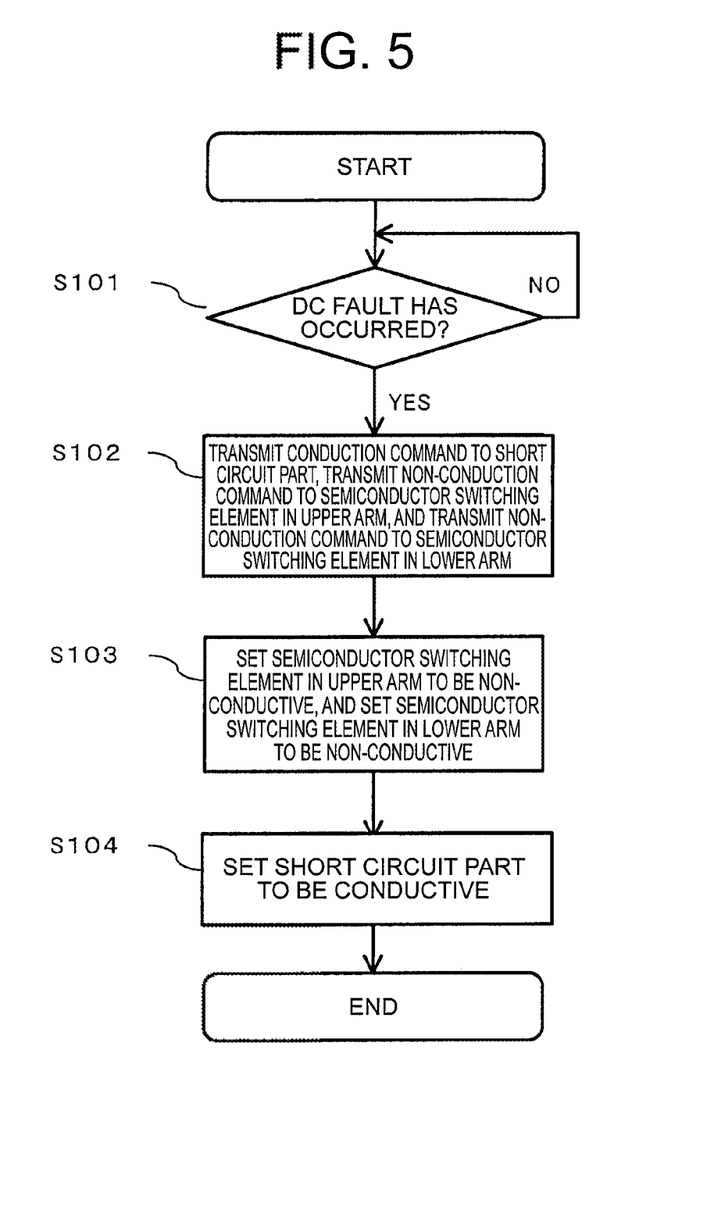
FIG. 5 is a flow chart for illustrating operation at the time of a DC fault in the related art.

Before the operation in the first embodiment is described, operation at the time of a DC fault of a converter cell in the related art is described here. FIG. 5 is a flow chart for illustrating the operation at the time of the DC fault in the related art. In FIG. 5, for easy understanding of differences from the operation in the first embodiment, a description is given assuming that a configuration of the converter cell 1 is the same as that in the first embodiment, that is, the configuration illustrated in FIG. 2A.

As illustrated in FIG. 5, in the converter cell in the related art, first in Step S101, it is determined, by the DC fault detection unit 3, whether the DC fault has occurred. As a result, when it is determined that the DC fault has occurred (YES in Step S101), the processing proceeds to Step S102.

In Step S102, the control circuit 6 issues a conduction command to the short circuit part 15, and issues non-conduction commands to both of the semiconductor switching element 11u in the upper arm 13u and the semiconductor switching element 11b in the lower arm 13b.

Figure 6A:
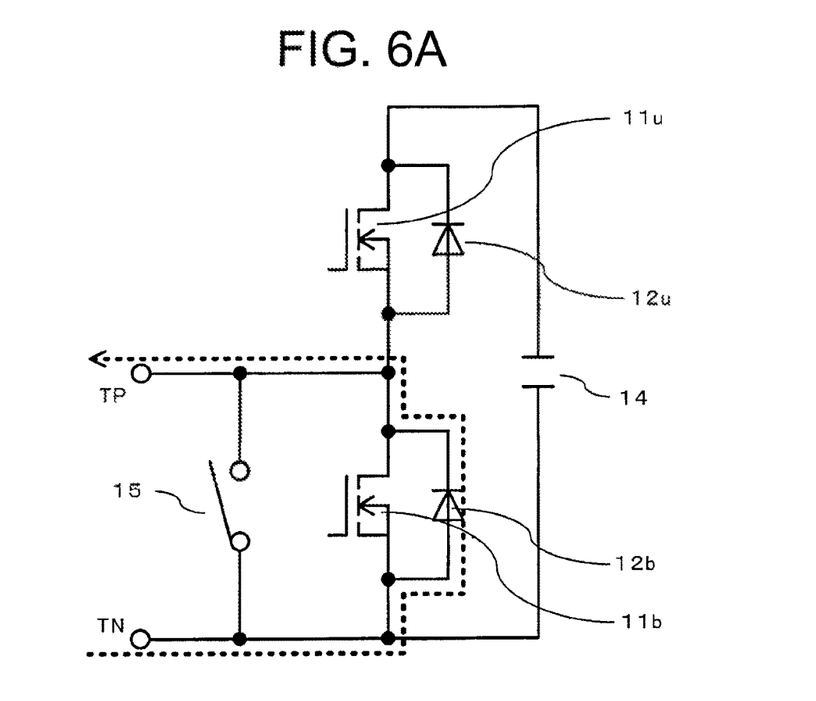
FIG. 6A is a diagram for illustrating a fault current path in the converter cell.

Subsequently, the processing proceeds to Step S103. In Step S103, in accordance with the commands from the control circuit 6 in Step S102, the semiconductor switching element 11u in the upper arm 13u and the semiconductor switching element 11b in the lower arm 13b are both sec to the non-conductive states. At this time, as illustrated in FIG. 6A, the fault current continues to flow through the diode 12b in the lower arm 13b.

Figure 6B:
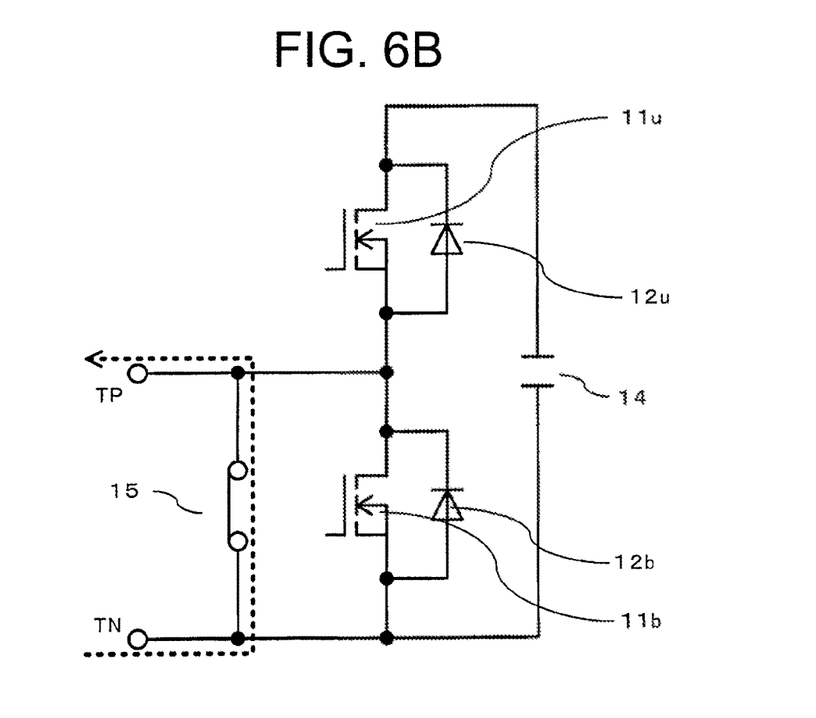
FIG. 6B is a diagram for illustrating a fault current path in the converter cell.

Finally, the processing proceeds to Step S104. In Step S104, in accordance with the command from the control circuit 6 in Step S102, as illustrated in FIG. 6B, the short circuit part 15 disposed in the converter cell 1 is set to a conductive state. As a result, the fault current that has flowed in the diode 12b is diverted to the short circuit part 15. Thereafter, the fault current is attenuated by an arc resistance at a DC fault point, and the fault is removed.

In the related art, the above-mentioned operation is performed to remove the DC fault. At this time, when a mechanical switch is used as the short circuit part 15, it usually takes several ms or more from when the DC fault detection unit 3 detects the DC fault until the short circuit part 15 is set to the conductive state. Meanwhile, it takes about several ms from when the DC fault detection unit 3 detects the DC fault until the semiconductor switching elements 11u and 11b are set to the non-conductive states. Therefore, a time lag of several ms or more is generated for the transition from the state of FIG. 6A in Step S103 to the state of FIG. 6B in Step S104. During this time lag, the fault current flows through the diode 12b in the lower arm 13b, and hence enough tolerance for the fault current is required of the diode 12b in the lower arm 13b. If the tolerance is insufficient, there is a fear that the diode 12b is broken. Moreover, when a MOSFET is used as each of the semiconductor switching elements 11u and 11b, a diode is included in the MOSFET, and hence there is a fear that the diode in the MOSFET may be broken by the fault current.

Figure 7:
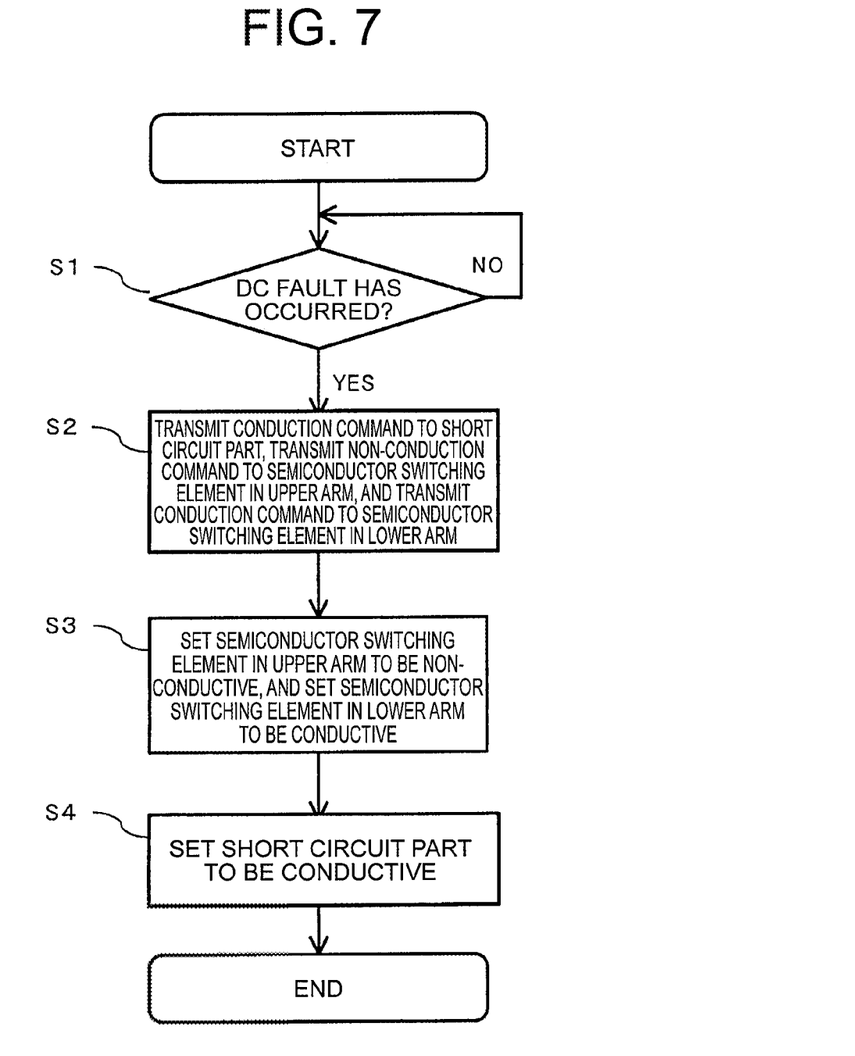
FIG. 7 is a flow chart for illustrating operation at the time of the DC fault of the power converter according to the first embodiment of the present invention.

Next, the operation at the time of the DC fault of the converter cell in the power converter described in the first embodiment of the present invention is described. FIG. 7 is a flow chart for illustrating the operation at the time of the DC fault in the first embodiment.

In the first embodiment, as illustrated in FIG. 7, first in Step S1, it is determined whether or not occurrence of the DC fault has been detected by the DC fault detection unit 3. When it is determined in Step S1 that the DC fault has occurred (YES in Step S1), the processing proceeds to Step S2. Meanwhile, when it is determined that no DC fault has occurred, the processing returns to Step S1, and the processing of Step S1 is repeated at constant intervals. The processing up to this operation is similar to that in the related art of FIG. 5.

In Step S2, the control circuit 6 issues a conduction command to the short circuit part 15, issues a non-conduction command to the semiconductor switching element 11u, and issues a conduction command to the semiconductor switching element 11b. Those commands are collectively referred to as "fault handling commands". In this manner, in the first embodiment, in Step S2, the semiconductor switching element 11b in the lower arm 13b, to which the short circuit part 15 is connected in parallel, is caused to transition to the conductive state instead of the non-conductive state. This operation is different from that of the related art of FIG. 5. Therefore, operation in the next Step S3 is also different.

Figure 8:
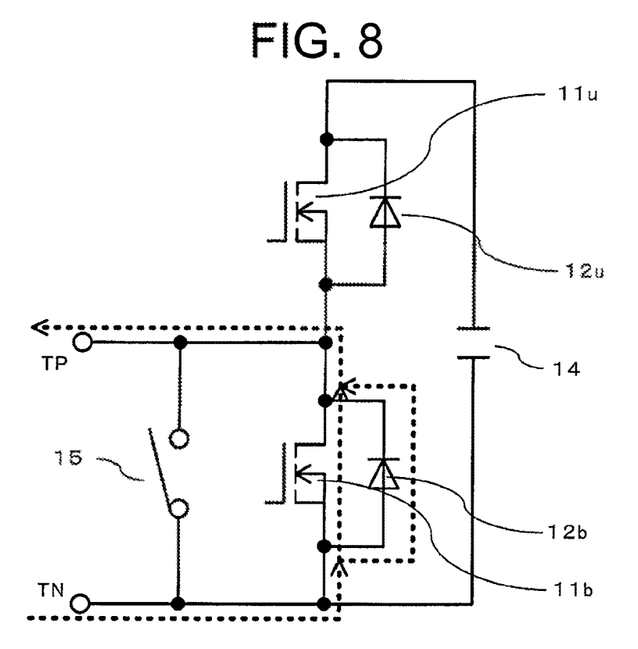
FIG. 8 is a diagram for illustrating a fault current path in the converter cell of the power converter according to the first embodiment of the present invention.

In Step S3, in accordance with the fault handling commands from the control circuit 6 in Step S2, the semiconductor switching element 11u is set to the non-conductive state, and the semiconductor switching element 11b is set to the conductive state. At this time, as illustrated in FIG. 8, the fault current is split to flow through the semiconductor switching element 11b and the diode 12b.

Thereafter, the processing proceeds to Step S4. In Step S4, in accordance with the fault handling command from the control circuit 6 in Step S2, as illustrated in FIG. 6B, the short circuit part 15 disposed in the converter cell 1 is set to the conductive state. As a result, the fault current that has flowed through the semiconductor switching element 11b and the diode 12b is diverted to the short circuit part 15. Thereafter, the fault current is attenuated by an arc resistance at a DC fault, point, and the fault is removed.

In the related art of FIG. 5, when the DC fault detection unit 3 detects the DC fault, first, the semiconductor switching element 11u in the upper arm 13u and the semiconductor switching element 11b in the lower arm 13b are both caused to transition to the non-conductive states. In contrast, the first embodiment of the present invention is different from the related art in that, when the DC fault detection unit 3 detects the DC fault, first, only the semiconductor switching element 11u in the upper arm 13u is caused to transition to the non-conductive state, and the semiconductor switching element 11b in the lower arm 13b, to which the short circuit part 15 is connected in parallel, is caused to transition to the conductive state.

Next, a description is given of the effects of the operation at the time of the DC fault of the converter cell in the power converter according to the first embodiment of the present invention.

As described above, in the first embodiment, as illustrated in FIG. 8, during the time lag until the short circuit part 15 is set to the conductive state, the semiconductor switching element 11b and the diode 12b are both set to the conductive states, and the fault current is split to the semiconductor switching element 11b and the diode 12b. Therefore, as compared to the case in which all of the fault current is caused to flow through the diode 12b as in the related art, a conduction loss generated in the diode 12b is reduced. Therefore, the diode 12b can be prevented from being broken by the fault current. Moreover, as compared to the related art, the tolerance of the diode 12b can be set to be low, with the result that an inexpensive diode 12b can be used, and that the cost down effect can be obtained.

In the first embodiment, the example in which the fault handling commands are transmitted to all the converter cells is described, but the fault handling commands may be transmitted to only converter cells in phase arras through which the fault current flows. When the fault handling commands are transmitted in this manner, the fault current can be prevented from flowing also into the phase through which no fault current flows. As a method of determining that the fault current flows, for example, the determination can be made by detecting an electric current in each phase arm.

Next, a description is given of the order of switching between the conductive and non-conductive states of the switching elements in the operation at the time of the DC fault of the converter cell in the power converter according to the first embodiment of the present invention.

As described above, in the power converter according to the first embodiment, when the DC fault occurs, the semiconductor switching element 11b on the side to which the short circuit part 15 is connected in parallel is set to the conductive state, and the other semiconductor switching element 11u is set to the non-conductive state this time, in general, in an actual device, there is a variation in electrical characteristics of the semiconductor switching elements 11u and 11b or a variation in signal delay of the control circuit 6, and hence it is difficult for both of the semiconductor switching elements 11u and 11b to transition between the conductive and non-conductive states at the same time. Therefore, when the states of the converter cell 1 before the DC fault is detected are that the semiconductor switching element 11b on the side to which the short circuit part 15 is connected in parallel has been set to the non-conductive state, and that the other semiconductor switching element 11u has been set to the conductive state, and when the protection operation in the first embodiment is performed in response to the detection of the DC fault, depending on the degree of the above-mentioned variations, the semiconductor switching element 11b on the side to which the short circuit part 15 is connected in parallel may transition to the conductive state first, and then the other semiconductor switching element 11u may transition to the non-conductive state. In such case, there is a period in which both the semiconductor switching elements 11u and 11b are set to the conductive states, and hence the energy storage device 14 is set to the short-circuit state. As a result, a very large short-circuit current may be allowed to flow through both the semiconductor switching elements 11u and 11b, and in the worst case, the semiconductor switching elements 11u and 11b may be damaged.

In order to handle such problem, in the first embodiment, when the DC fault detection unit 3 detects the DC fault, in response to the fault handling commands from the control circuit 6, response time until the semiconductor switching element 11b on the side of the arm to which the short circuit part 15 is connected in parallel is set to the conductive state is set to be longer than response time until the semiconductor switching element 11u on the side of the other arm is set to the non-conductive state. In this manner, the semiconductor switching element 11u is set to be non-conductive first, and then the semiconductor switching element 11b is set to the conductive state. As a result, the situation in which both the semiconductor switching elements 11u and 11b are set to the conductive states is avoided, and hence the semiconductor switching elements 11u and 11b can be prevented from being damaged, by the short circuit of the energy storage device 14. How much the response time until the semiconductor switching element 11b on the side of the arm to which the short circuit part 15 is connected in parallel is set to the conductive state is set to be longer than the response time until the semiconductor switching element 11u on the side of the other arm is set to the non-conductive state is determined on the basis of the variation in electrical characteristics of the semiconductor switching elements 11u and 11b and the variation in signal delay of the control circuit 6. Those variations can be calculated on the basis of data sheets of circuit elements used in the semiconductor switching elements 11u and 11b or the control circuit 6, for example. Moreover, the adjustment of the response time can be implemented by means of hardware, for example, a generally-used delay circuit, or by means of software, for example, a control program.

Next, operation after the removal of the DC fault of the converter cell in the power converter according to the first embodiment of the present invention is described.

In general, the power converter used in the DC power system is allowed to temporarily suspend the operation when the DC fault occurs, but after that, it may be required for the power converter to be able to restart at high speed (for example, in one second or less after the occurrence of the DC fault). In order to satisfy such demand, it is required for the power converter to perform a recovery operation immediately after the DC fault is resolved.

Figure 9:
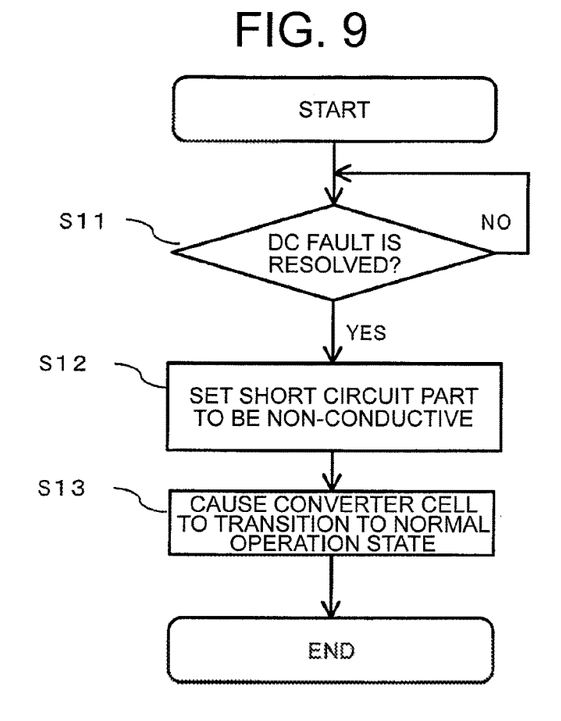
FIG. 9 is a flow chart for illustrating operation of the power converter according to the first embodiment of the present invention after the DC fault is resolved.

FIG. 9 is a flow chart for illustrating the operation of the power converter according to the first embodiment of the present invention after the DC fault is resolved.

First in Step S11, the power converter according to the first embodiment determines, by the DC fault detection unit 3, whether the DC fault is resolved. The determination on whether the fault current is resolved may be made on the basis of whether or not the short-circuit current that flows at the time of the fault is attenuated below a preset current threshold. Therefore, comparing a detected current value, which has been detected by the DC fault detection unit 3, and the current threshold, when the detected current value is the current threshold or less, the control circuit 6 determines that the fault current is resolved, and on the other hand, and when the detected current value is larger than the current threshold, the control circuit 6 determines that the fault current is not resolved.

When it is determined in Step S11 that the DC fault is resolved, the processing proceeds to Step S12. In Step S12, the control circuit 6 sets the short circuit part 15 to the non-conductive state. It has been detected in Step S11 that the DC fault is resolved, and hence a state in which no short-circuit current or a sufficiently small current flows through the short circuit part 15 has been established at this time point, with the result that the short circuit part 15 can be easily caused to transition to the non-conductive state. Moreover, when the short circuit part 15 remains to be in the conductive state, the output of the converter cell 1 is in the short-circuit state, and hence the converter cell 1 cannot output a voltage under this state.

Finally, the processing transitions to Step S13. In Step S13, the converter cell 1 is caused to recover the above-mentioned normal operation state. In Step S13, the short circuit part 15 has already been set to the non-conductive state, and hence the converter cell 1 can output a desired voltage.

With the above-mentioned function, in the power converter according to the first embodiment, the power converter can perform the recovery operation immediately after the fault is resolved, and high-speed restart after the DC fault is achieved.

In the above description with regard to FIG. 9, the control circuit 6 outputs the command to the short circuit part 15 in Step S12, and outputs the command to the converter cell 1 in Step S13. As a result, after the short circuit part 15 is set to the non-conductive state, the switching operations of the semiconductor switching elements 11u and 12b resume normal operations. However, without setting the timings to output the commands in two stages in such manner, fault recovery commands may be output to the short circuit part 15 and the converter cell 1 at the same time. It should be noted, however, that in that case, it is required to set in advance, in response to the fault recovery commands, response time until the switching operations of the semiconductor switching elements 11u and 11b resume the normal operations to be longer than response time until the short circuit part 15 is set to the non-conductive state.

As described above, the power converter according to the first embodiment is the power converter, which is configured to interconnect an AC system and a DC system to transfer electric power, the power converter including: the DC terminals P and N configured to transfer DC power; the AC terminals U, V, and W configured to transfer AC power; the plurality of converter cells 1, which are disposed between the DC terminals P and N and the AC terminals U, V, and W and are connected in series to one another; the DC fault detection unit 3 disposed between the DC terminals P and N and the AC terminals U, V, and W to detect the DC fault that has occurred in the DC system; and the control circuit 6 configured to control each converter cell 1. Moreover, each converter cell 1 includes: the upper arm 13u, which includes a first semiconductor switching element and a first diode and serves as a first arm; the lower arm 13b, which is connected in series to the first arm, includes a second semiconductor switching element and a second diode, and serves as a second arm; the output terminals TP and TN connected to both ends of the second arm; and the short circuit part 15 connected in parallel to the second arm. When the DC fault detection unit 3 detects the occurrence of the DC fault, the control circuit 6 outputs, to each converter cell 1, the fault handling commands for setting the short circuit part 15 to the conductive state, setting the second semiconductor switching element in the second arm to the conductive state, and setting the first semiconductor switching element in the first arm to the non-conductive state to set both of the second semiconductor switching element and the second diode to the conductive states in the second arm. As a result, the fault current to flow through the diode 12b at the time of the DC fault can be split to the semiconductor switching element 11b, and hence the loss generated in the energy storage device 14, which serves as a diode, is reduced.

Moreover, in the first embodiment, the short circuit part 15 is formed of the mechanical switch, and there is adopted the configuration in which, in response to the fault handling commands output by the control circuit 6, the response time until the second semiconductor switching element in the second arm is set to the conductive state and the response time until the first semiconductor switching element in the first arm is set to the non-conductive state are shorter than the response time until the short circuit part 15 is set to the conductive state. As a result, the diode 12b in the second arm, which is connected in parallel to the output terminals TP and TN, can be prevented from being broken during the time lag until the mechanical switch forming the short circuit part 15 is set to the conductive state.

Moreover, in the first embodiment, there is adopted the configuration in which, in response to the fault handling commands output by the control circuit 6, the response time until the second semiconductor switching element is set to the conductive state is longer than the response time until the first semiconductor switching element is set to the non-conductive state. As a result, the switching timings in the first arm and the second arm can be shifted to prevent the energy storage device 14 from being short-circuited.

Moreover, in the first embodiment, when determining that the DC fault is resolved after the DC fault has occurred, the control circuit 6 outputs the fault recovery commands for setting the short circuit part 15 to the non-conductive state, and causing switching operations of the first and second semiconductor switching elements of each converter cell 1 to resume normal operations. As a result, the power converter can be restarted immediately after the DC fault is resolved.

Moreover, in the first embodiment, the control circuit 6 outputs the fault recovery commands so that, after the short circuit part 15 is set to the non-conductive state, the switching operations of the first and second semiconductor switching elements resume the normal operations. When the short circuit part 15 remains to be in the conductive state, the output of the converter cell 1 is set to the short-circuit state. However, in the first embodiment, the short circuit part 15 is set to be non-conductive before the switching operations of the first and second semiconductor switching elements resume the normal operations, and hence the situation in which the output of the converter cell 1 is set to the short-circuit state is avoided. As a result, in the first embodiment, when the converter cell 1 performs the recovery operation from the DC fault, the output of the converter cell 1 can be reliably prevented from being short-circuited.

Moreover, in the first embodiment, the control circuit 6 determines whether or not the DC fault is resolved on the basis of the output from the DC fault detection unit. As a result, it is not required to dispose an additional device configured to detect whether or not the DC fault is resolved, and hence it is possible to detect that the DC fault is resolved without increasing the number of parts.

Moreover, in the first embodiment, the DC fault detection unit 3 is formed of the current sensor configured to detect the fault current generated at the time of the DC fault. The control circuit 6 determines whether or not the DC fault is resolved on the basis of a current value detected by the current sensor. Specifically, the control circuit 6 determines that the DC fault is not resolved when the current value detected by the current sensor is larger than a threshold, and determines that the DC fault is resolved when the current value detected by the current sensor is the threshold or less. As a result, it is not required to dispose an additional device configured to detect whether or not the DC fault is resolved. Therefore, it is possible to detect that the DC fault is resolved without increasing the number of parts, and with the determination being made on the basis of the current value detected by the current sensor, accurate determination can be made.

Second Embodiment

In the first embodiment described above, there has been described the configuration in which, when determining that the DC fault is resolved after the DC fault has occurred, the control circuit 6 outputs the fault recovery commands for causing the converter cell to resume the normal operations.

In a second embodiment of the present invention, a description is given of a configuration in which, when determining that a DC fault is resolved after the DC fault has occurred, the control circuit 6 performs failure determination on the short circuit part 15, the first switching element, and the second semiconductor switching element, and when determining a failure, does not output the fault recovery commands for causing the converter cell to resume the normal operations.

In the configuration and operation of a power converter according to the second embodiment, a description of parts that are same as or equivalent to those in the first embodiment is omitted, and a description is made only on different parts.

Figure 10:
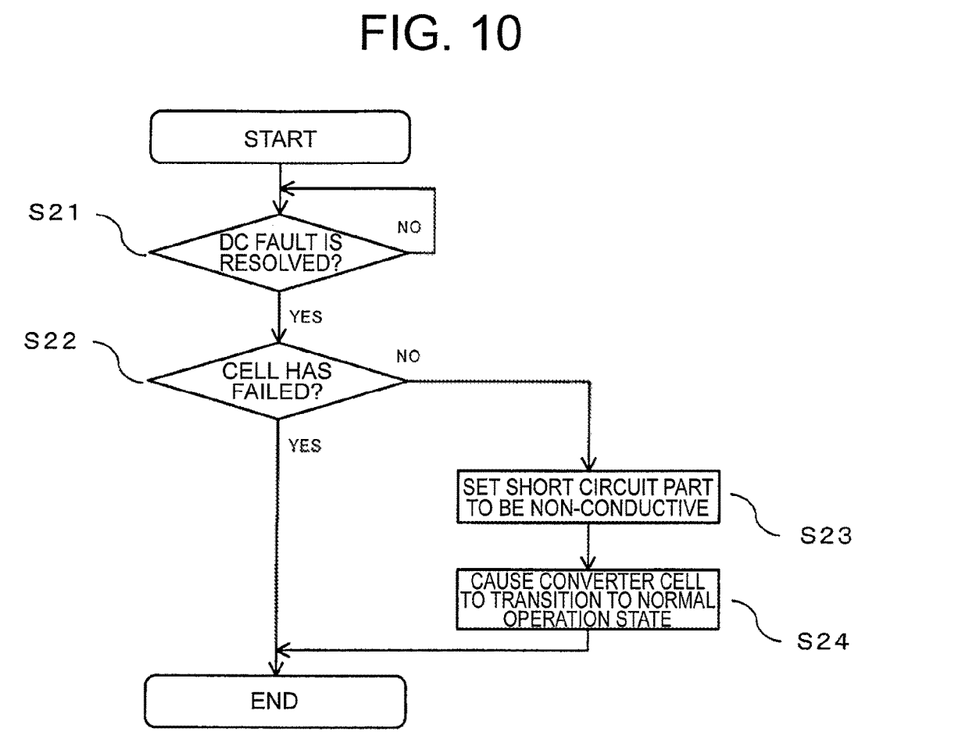
FIG. 10 is a flow chart for illustrating operation of a power converter according to a second embodiment of the present invention after a DC fault is resolved.

FIG. 10 is a flow chart for illustrating operation of the power converter according to the second embodiment after the DC fault is resolved.

First in Step S21, the power converter determines, by the DC fault detection unit 3, whether the DC fault is resolved. As in the first embodiment, the determination on whether the fault current is resolved may be made on the basis of whether or not the short-circuit current that flows at the time of the fault is attenuated below a preset current threshold.

When it is determined in Step S21 that the DC fault is resolved, the processing proceeds to Step S22. In Step S22, the control circuit 6 determines the presence or absence of a failure for the short circuit part 15, the first switching element, and the second semiconductor switching element of each converter cell.

When it is determined in Step S22 that at least one of the short circuit part 15, the first switching element, and the second semiconductor switching element of the converter cell has failed, the control circuit 6 does not transmit the fault recovery commands to the converter cell that is determined to have failed.

When it is determined in Step S22 that the converter cell has not failed, the control circuit 6 transmits the fault recovery commands to the converter cell that is determined to have not failed as in the first embodiment (Step S23 and Step 24).

For example, by adopting a switch having a failure diagnosis function in the short circuit part 15, the failure determination of the short circuit part 15 may be made on the basis of a failure determination signal transmitted from the short circuit part 15. The failure determination of the short circuit part 15 is not limited to the above-mentioned method, and the failure determination of the short circuit part 15 by another method may equally be applied.

For the failure determination of the first semiconductor switching element and the second semiconductor switching element, for example, the conduction commands may be transmitted alternately to the first semiconductor switching element and the second semiconductor switching element, an electric current that flows through the leg including the first semiconductor switching element and the second semiconductor switching element at that time may be measured, and when the electric current exceeds a preset threshold, it may be determined that a short-circuit failure has occurred in any one of the semiconductor switching elements. Moreover, the conduction commands may be transmitted to the first semiconductor switching element and the second semiconductor switching element at the same time, the electric current that flows through the leg including the first semiconductor switching element and the second semiconductor switching element at that time may be measured, and when the electric current is the above-mentioned threshold or less, it may be determined that an open-circuit failure has occurred in any one of the semiconductor switching elements. The failure determination of the semiconductor switching elements is not limited to the above-mentioned methods, and the failure determination by other methods may equally be applied.

As described above, also in the second embodiment, effects similar to those of the first embodiment described above can be obtained. Further, in the second embodiment, in the recovery operation of the power converter after the fault is resolved, failure determination is performed on each converter cell, and the recovery operation is not performed for the failed converter cell. Therefore, the recovery operation of the power converter after the fault is resolved can be reliably performed.

REFERENCE SIGNS LIST 1 converter cell, 2 reactor, 3 DC fault detection unit, 6 control circuit, 11u, 11b semiconductor switching element, 12u, 12b diode, 13u upper arm, 13b lower arm, 14 energy storage device, 15 short circuit part, U, V, W AC terminal, P, N DC terminal, TP, TN output terminal

The invention claimed is:

1. A power converter, which is configured to interconnect an AC system and a DC system to transfer electric power, the power converter comprising:
   a plurality of converter cells connected in series to one another;
   a DC fault detector to detect a fault that has occurred in the DC system; and
   a controller to control each of the plurality of converter cells,
   wherein each of the plurality of converter cells includes:
      a first arm, which includes a first semiconductor switching element and a first diode;
      a second arm, which is connected in series to the first arm, and includes a second semiconductor switching element and a second diode;
      output terminals connected to both ends of the second arm; and
      a short circuit switch formed of a mechanical switch and connected in parallel to the second arm,
   wherein, when the DC fault detector detects the occurrence of the fault, the controller is configured to output a fault handling command to each of the plurality of converter cells, and
   wherein the fault handling command is configured to set the first semiconductor switching element to a non-conductive state, set the second semiconductor switching element to a conductive state, and set the short circuit switch to a conductive state,
   wherein, in response to the fault handling command output by the controller, response time until the second semiconductor switching element is set to the conductive state is configured to be longer than response time until the first semiconductor switching element is set to the non-conductive state.

2. The power converter according to claim 1, wherein the fault handling command is configured to prevent a short-circuit current from flowing through both of the first semiconductor switching element and the second semiconductor switching element.

3. The power converter according to claim 1, wherein, when the occurrence of the fault is detected, the controller is configured to output the fault handling command to only a converter cell through which a fault current flows among the plurality of converter cells.

4. The power converter according to claim 1, wherein the controller is configured to output, when determining that the fault is resolved after the fault has occurred, a fault recovery command for setting the short circuit switch to a non-conductive state, and causing switching operations of the first semiconductor switching element and the second semiconductor switching element of each of the plurality of converter cells to resume normal operations.

5. The power converter according to claim 4, wherein the controller is configured to output the fault recovery command so that, after the short circuit switch is set to the non-conductive state, the switching operations of the first semiconductor switching element and the second semiconductor switching element resume the normal operations.

6. The power converter according to claim 4, wherein the controller is configured to determine whether the fault is resolved based on output from the DC fault detector.

7. The power converter according to claim 6,
   wherein the DC fault detector is formed of a current sensor configured to detect a fault current generated when the fault occurs,
   wherein the controller is configured to determine whether the fault is resolved based on a current value detected by the current sensor, and
   wherein the controller is configured to:
      determine that the fault is yet to be resolved when the current value detected by the current sensor is greater than a threshold; and
      determine that the fault is resolved when the current value detected by the current sensor is equal to or less than the threshold.

8. The power converter according to claim 4, wherein the controller is configured to:
   perform failure determination on the short circuit switch when determining that the fault is resolved after the fault has occurred;
   when the short circuit switch has not failed, output the fault recovery command for setting the short circuit switch to the non-conductive state, and causing the switching operations of the first semiconductor switching element and the second semiconductor switching element of each of the plurality of converter cells to resume the normal operations; and
   avoid outputting the fault recovery command when the short circuit switch has failed.

9. The power converter according to claim 4, wherein the controller is configured to:
   perform failure determination on the first semiconductor switching element and the second semiconductor switching element when determining that the fault is resolved after the fault has occurred;
   when none of the first semiconductor switching element and the second semiconductor switching element has failed, output the fault recovery command for setting the short circuit switch to the non-conductive state, and causing the switching operations of the first semiconductor switching element and the second semiconductor switching element of each of the plurality of converter cells to resume the normal operations; and
   avoid outputting the fault recovery command when at least one of the first semiconductor switching element or the second semiconductor switching element has failed.

* * * * *